United States Patent [19]

Masumoto et al.

[11] Patent Number: 4,631,334

[45] Date of Patent: Dec. 23, 1986

[54] OPTICAL ARTICLES OF BRANCHED POLYCARBONATE RESIN

[75] Inventors: Mituhiko Masumoto; Shigeo Yanada, both of Osaka; Toshiaki Izumida, Hyogo; Kazuyuki Akahori, Osaka, all of Japan

[73] Assignee: Mitsubishi Gas Chemical Company, Inc., Japan

[21] Appl. No.: 721,604

[22] Filed: Apr. 10, 1985

[30] Foreign Application Priority Data

Apr. 10, 1984 [JP] Japan .................................. 59-71287
Apr. 10, 1984 [JP] Japan .................................. 59-71288

[51] Int. Cl.$^4$ ............................................. C08G 63/62
[52] U.S. Cl. .................................. 528/202; 528/199; 528/204
[58] Field of Search ................ 528/204, 196, 199, 202

[56] References Cited

U.S. PATENT DOCUMENTS 4,185,009  1/1980  Idel et al. ........................ 528/204 X Primary Examiner—Theodore E. Pertilla
Attorney, Agent, or Firm—Sughrue, Mion, Zinn, Macpeak, and Seas

[57] ABSTRACT

A transparent optical article is disclosed, which is produced by molding a branched polycarbonate resin having a viscosity average molecular weight of from 13,000 to 20,000 as prepared from at least one dihydric phenol compound in the presence of a polyfunctional organic compound having at least two phenolic hydroxyl groups as a branching agent in an amount of from 0.02 to 3 mol % based on the total amount of the dihydric phenol compound. The transparent molded optical article includes digital audio discs, video discs, memory discs and lenses used in the optical reading system. The optical article is greatly reduced in double refraction and has a high mechanical strength.

6 Claims, No Drawings

OPTICAL ARTICLES OF BRANCHED POLYCARBONATE RESIN

FIELD OF THE INVENTION

The present invention relates to optical articles of a branched polycarbonate resin. More particularly, it relates to transparent polycarbonate resin optical articles which are prepared by injection or compression molding and which are superior in toughness and continuous moldability by injection molding. The optical articles of this invention include digital audio discs, video discs, memory discs used in the optical reading system and optical lenses.

BACKGROUND OF THE INVENTION

It is known, as described in Japanese Patent Application (OPI) No. 131654/81, for example, that an acryl resin is useful as a material for production of transparent optical articles because of its excellent properties such as (1) good transparency, (2) good fluidity and (3) low double refraction (the term "OPI" as used herein means a published unexamined Japanese patent application). Such acryl resins, however, have disadvantages in that heat resistance is as low as about 70° C., impact resistance is low, and may wrap on absorbing water.

In order to eliminate these disadvantages of acryl resins, a polycarbonate resin having a viscosity average molecular weight of from 15,000 to 18,000 is now under investigation as a material for production of optical discs and lenses, as disclosed in Japanese Patent Application (OPI) No. 180553/83. Such polycarbonate resins, however, still have disadvantages in that the fluidity is insufficient and the double refraction as a most important factor in producing optical articles is still high. This poor fluidity has been improved by decreasing the molecular weight of the polycarbonate resin, or by increasing a molding temperature.

Although the improvement in the fluidity is practically useful, it causes different problems such as insufficient mechanical strength and stringiness during the molding process thereby making it impossible to mold articles continuously. Thus, the polycarbonate resin is still limited in its practical use. In the precision optical system used in reading or writing of information utilizing laser, it has been desired to develop optical materials having a low double refraction, a high mechanical strength, and being free from stringiness capable of being molded continuously. The term "stringiness" as used herein means a phenomenon that a molten resin remains between a nozzle and an end of a sprue, and it sticks to the sprue in a string form in taking out a molded article.

The double refraction of a transparent optical article as described above varies with properties of the resin material used and also with molding conditions.

In molding a transparent optical article, a resin is melted and cooled in a mold. If the viscosity of the molten resin is too high, the resin is cooled in a non-uniform state whereby optical strain remains in the resulting molded article which then gives rise to undesired double refraction. Particularly, if the viscosity of the resin used in the injection molding is too high, orientation of the resin remains in a flow direction since the resin is injected in a mold whereby double refraction is liable to develop in the molded article.

As a means for moderating molding conditions, a conventionally known technique, that is, a method for compounding plasticizers to prepare a molding material of high fluidity can be considered. However, when conventional plasticizers for polycarbonate resins such as olefin- and phosphate-based plasticizers are added in an amount sufficient to improve moldability, fluidity can be improved, but the desired optical molded article cannot be obtained due to contamination of mold with the plasticizer which results in the production of contaminated molded articles, or poor compatibility between the plasticizer and the polycarbonate resin lowers the transparency which results in the production of molded articles having poor appearance. Moreover, physical properties are reduced to an extent that is not practically acceptable.

For this reason, the reduction in double refraction of transparent optical articles has been considered by changing molding conditions, particularly increasing a molding temperature, or by using a low molecular weight polycarbonate resin having good fluidity. However, when the low molecular weight polycarbonate resin is molded at high temperatures, the resulting molded article is reduced in double refraction but is poor in strength and causes stringiness in injection molding. Thus, a material which is satisfactory in total aspects of double refraction, strength and continuous moldability has not yet been discovered.

SUMMARY OF THE INVENTION

An object of the present invention is to provide a material for optical articles, which exhibits improved double refraction in injection molding and compression molding, and which is superior in toughness and continuous moldability in the injection molding.

Another object of the present invention is to provide a transparent optical article which is improved in double refraction and strength.

Accordingly, the present invention relates to a molded optical article of a branched polycarbonate resin having a viscosity average molecular weight in the range of from 13,000 to 20,000 which is produced from at least one dihydric phenol compound in the presence of a polyfunctional organic compound having at least two phenolic hydroxyl groups as a branching agent in an amount of 0.02 to 3 mol% based on the total amount of the dihydric phenol compound.

In a preferred embodiment of this invention, the branching agent is used in an amount of from 0.1 to 1.0 mol% based on the total amount of the dihydric phenol compound, and, further, a transparent optical molded article is produced from a terminal long-chain alkyl branched polycarbonate resin obtained by using a specific alkylphenol represented by the formula (1):

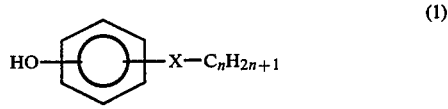

wherein X represents a chemical bond, —COO—, or —O—, and n is an integer of from 8 to 30, as a terminator in an amount of at least 10 mol% based on the total amount of the terminators used. In the formula (1), X is preferably —COO— or —O— and n is preferably an integer of from 10 to 20.

DETAILED DESCRIPTION OF THE INVENTION

The branched, long chain-terminated alkyl-branched polycarbonate resin of the present invention is an aromatic polycarbonate resin of homopolymer or copolymer, produced from a dihydric phenol compound as a main component and phosgene or a carbonic acid diester in the same manner as in the production of the conventional polycarbonate resins except that a polyfunctional organic compound having at least two phenolic hydroxyl groups is used as a branching agent; in a more preferred embodiment, a phenol compound having a long-chain alkyl group is used as a terminator.

Preferred examples of dihydric phenol compounds (hereinafter abbreviated as "BP") are those represented by the formula (2):

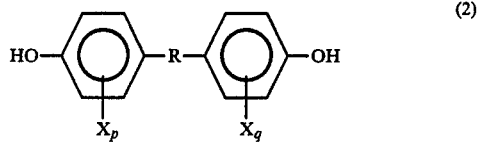

(2)

wherein R represents a divalent aliphatic, alicyclic or phenyl-substituted alkyl group having 1 to 15 carbon atoms, or —O—, —S—, —SO—, —SO$_2$— or —CO—, X represents an alkyl group, an aryl group, or a halogen atom, and p and q each represents an integer of 0 to 2, and include bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane or a mixture thereof. Of these compounds, 2,2-bis(4-hydroxyphenyl)propane, 1,1-bis(4-hydroxyphenyl)cyclohexane, and 1,1-bis(4-hydroxyphenyl)-1-phenylethane are particularly preferred.

Branching agents which can be used include polyhydroxy compounds such as fluoroglycine, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, α,α',α"-tri(4-hydroxyphenyl)-1,3,5-triisopropylbenzene, etc., and 3,3-bis(4-hydroxyaryl)oxyindole (i.e., isatin bisphenol), 5-chloroisatin, 5,7-dichloroisatin, and 5-bromoisatin. Particularly preferred compounds are 2,6-dimethyl-2,4,6-tri(4-hydroxyphenyl)heptene-3, 4,6-dimethyl-2,4,6-tri(4-hydroxyphenyl)heptene-2, 1,1,1-tri(4-hydroxyphenyl)ethane, α,α',α"-tri(4-hydroxyphenyl)-1,3,5-triisopropylbenzene, 3,3-bis(4-hydroxy-3-methylphenyl)oxyindoles such as 5-chloro-3,3-bis(4-hydroxy-3-methylphenyl)oxyindole, and 5,7-dichloro-3,3-bis(4-hydroxy-3-methylphenyl)oxyindole.

The branching agent can be used in an amount of from 0.02 to 3 mol%, preferably from 0.1 to 1.0 mol% based on the amount of BP. If the amount of the branching agent is less than 0.02 mol%, the branched structure is not formed sufficiently. On the other hand, if the amount exceeds 3 mol%, high molecular compounds are formed thereby yielding disadvantages such as a reduction in transparency of the molded article.

Examples of the terminator represented by the general formula (1) are long chain alkyl-substituted phenols such as octylphenol, nonylphenol, laurylphenol, palmitylphenol, and stearylphenol; long chain alkyl esters of hydroxybenzoic acid such as octyl hydroxybenzoate, lauryl hydroxybenzoate, nonyl hydroxybenzoate, and stearyl hydroxybenzoate; and long chain alkyl ether phenols such as octyl ether phenol, nonyl ether phenol, palmityl ether phenol, octadecyl ether phenol, and dodecyloxy phenol. Particularly preferred terminators are long chain alkyl esters of hydroxybenzoic acid and long chain alkyl ether phenols.

The amount of the terminator used can be determined easily by one skilled in the art depending on the desired molecular weight, etc., but it is usually used in an amount of from 3.0 to 10.0 mol%, preferably from 4.4 to 8.0 mol%, based on the amount of BP. It is also preferred that other terminators such as p-tert-butylphenol be added in combination in an amount of from 5 to 90 mol% of the total terminators.

The branched polycarbonate resin of the present invention including the long chain-terminated alkyl-branched polycarbonate resin is usually produced by the interfacial polymerization process.

In spite of the branched structure of the polycarbonate resin of the present invention, it unexpectedly shows fluid characteristics (Q value) equal to or higher than those of the conventional polycarbonate resins in a preferred viscosity average molecular weight range of from 13,000 to 20,000 of the present invention. Further, as a matter of course, the polycarbonate resin of the present invention has a markedly increased fluidity as a result of introduction of a long chain alkyl group in the terminal.

The Q value is a melt viscosity as measured with a flow tester in which the amount of a molten resin which flows through a nozzle (1 mm in diameter and 10 mm in length) under conditions of temperature 280° C. and pressure 160 kg/cm$^2$ is expressed in terms of cc/sec. unit. As the melt viscosity decreases, the Q value increases.

In polycarbonate resins, there is a correlation between the Q value of the resin and the double refraction of an article formed from the resin. That is, if the Q value is more than $20 \times 10^{-2}$ cc/sec., preferably more than $30 \times 10^{-2}$ cc/sec., the double refraction is improved as compared with conventional polycarbonate resins or their compositions used for the production of optical articles. Therefore, the viscosity average molecular weight of the branched polycarbonate resin is suitably controlled so as to have a Q value of at least $20 \times 10^{-2}$ cc/sec., preferably at least $30 \times 10^{-2}$ cc/sec., and more preferably from $40 \times 10^{-2}$ to $100 \times 10^{-2}$ cc/sec. For this purpose, in the case of the branched polycarbonate resin, the viscosity average molecular weight is adjusted to in the range of from 13,000 to 20,000 and preferably in the range of from 14,000 to 16,000 and, in the case of the long chain-terminated alkyl-branched polycarbonate resin, it is adjusted to in the range of from 13,000 to 20,000 and preferably from 14,000 to 18,000. If the molecular weight is less than 13,000, the fluidity of the resin is satisfied but other problems such as a low mechanical strength may occur.

The above-produced branched polycarbonate resin is molded to produce a transparent polycarbonate resin optical article of the present invention.

Molding of the polycarbonate resin is usually carried out by techniques such as injection molding and compression molding. The injection and compression moldings can be conducted at a resin temperature of from 280° to 360° C. and preferably from 320° to 345° C.

The molded optical article of the branched polycarbonate resin according to the present invention generally has a double refraction equivalent to or markedly improved over optical articles prepared from conventional polycarbonate resins having the same viscosity average molecular weight under the same molding conditions, and is free from stringiness during the molding process. Thus, continuous molding can be carried out without causing any troubles. Moreover, the molded optical article has excellent mechanical strength, and no brittle failure occurs even it is bent manually.

The present invention is further illustrated in greater detail by the following examples, but the present invention is not limited thereto.

REFERENCE EXAMPLE 1

3.7 kg of sodium hydroxide was dissolved in 42 l of water, and then 7.3 kg of 2,2-bis(4-hydroxyphenyl)propane (hereinafter referred to "BPA"), 25 g of 2,6-dimethyl-2,4,6-tri(4-hydroxyphenyl)heptene-3 and 8 g of hydrosulfite (sodium dithionite dihydrate) were dissolved therein while maintaining the aqueous solution at 20° C. Thereafter, 28 l of methylene chloride was added to the solution, and 305 g of p-tert-butylphenol (hereinafter referred to "PTBP") was added to the mixture with stirring. Subsequently, 3.5 kg of phosgene was blown thereinto over 60 minutes. After completion of blowing, the resulting mixture was vigorously stirred to emulsify the reaction solution, and 8 g of triethylamine was added to the emulsion. The resulting mixture was stirred for about 1 hour to effect polymerization. The polymerization solution was separated into an aqueous layer and an organic layer, and the organic layer was neutralized with phosphoric acid and washed with water repeatedly until the washing solution became neutral. Then, 35 l of isopropanol was added to the organic layer to precipitate polymers. The precipitate was separated by filtration and dried to yield a polycarbonate resin as a white powder.

The polycarbonate resin was pelletized by extrusion at a temperature of 240° to 260° C. using a 40 mm vented extruder. The viscosity average molecular weight of the resulting pellets determined from an intrinsic viscosity of a methylene chloride solution of the pellets and a fluidity (Q value) of the pellets determined by a flow tester are shown in Table 1 below.

REFERENCE EXAMPLES 2 TO 9

The procedure of Reference Example 1 was repeated but using various amounts of the branching agents and the terminators shown in Table 1 below. The results obtained are also shown in Table 1 below.

EXAMPLES 1 TO 9, AND COMPARATIVE EXAMPLES 1 TO 3

Pellets produced in each of Reference Examples 1 to 9 were injected molded using a mold for audio compact discs by means of an injection molding machine (Neomat 350/120 equipped with SYCAP, manufactured by Sumitomo Juki Kogyo Co., Ltd.) at a resin temperature of 340° C., a mold temperature of 100° C. (Examples 1 to 6) or 90° C. (Examples 7 to 9), an injection pressure of 1,000 kg/cm$^2$, and a holding pressure of 300 kg/cm$^2$ to produce a disc having an outer diameter of 120 mm and a thickness of 1.2 mm. 48 hours after molding, double refraction of the molded disc was measured at points arbitrarily selected on circumferences of R=24 mm, R=42 mm and R=56 mm (radius from the center of the disc) using a polarized microscope (Model POM polarized microscope manufactured by Olympus Kogaku Kogyo Co., Ltd.). The molded disc was manually bent abruptly and any failure of the disc was examined visually. Only ductile deformation occurred, and brittle failure as encountered in usual glass, polystyrene, polymethyl methacrylate and conventional polycarbonate resin having the same viscosity average molecular weight was not observed. The results obtained are shown in Table 2 below.

In addition, molding was carried out at a molding temperature of 340° C., a mold temperature of 100° C., and a molding cycle of 25 seconds to examine stringiness. However, under such conditions, no stringiness was observed, and the molding could be conducted continuously.

For comparison, the procedure as described in Example 1 was repeated but using conventional BPA polycarbonate resins having viscosity average molecular weights of 16,000 (Q value: 34 cc/sec.) and 18,000 (Q value: $19 \times 10^{-2}$ cc/sec.) respectively (Comparative Examples 1 and 2) and a composition of a polycarbonate resin having a viscosity average molecular weight of 18,000 and 5 wt% of tricresyl phosphate (TCP) (Comparative Example 3). The results obtained are shown in Tables 1 and 2.

TABLE 1

| Reference Example No. | Terminator Type | Terminator Amount (mol %) | Branching Agent Type* | Branching Agent Amount (mol %) | Viscosity Average Molecular Weight ($\times 10^{-3}$) | Q Value (cc/sec $\times 10^{-2}$) |
|---|---|---|---|---|---|---|
| 1 | PTBP | 6.35 | A | 0.2 | 16 | 42 |
| 2 | PTBP | 5.63 | A | 0.2 | 18 | 28 |
| 3 | PTBP | 7.18 | A | 0.2 | 14 | 62 |
| 4 | PTBP | 6.35 | B | 0.1 | 16 | 40 |
| 5 | PTBP | 5.63 | B | 0.1 | 18 | 26 |
| 6 | PTBP | 7.08 | B | 0.1 | 14 | 58 |
| 7 | Stearylphenol | 6.50 | A | 0.2 | 16 | 85 |
| 8 | Stearyl hydroxybenzoate | 6.00 | B | 0.15 | 17 | 68 |
| 9 | Stearyl hydroxybenzoate | 3.40 | A | 0.2 | 15 | 70 |

TABLE 1-continued

| Reference Example No. | Terminator Type | Terminator Amount (mol %) | Branching Agent Type* | Branching Agent Amount (mol %) | Viscosity Average Molecular Weight ($\times 10^{-3}$) | Q Value (cc/sec $\times 10^{-2}$) |
| --- | --- | --- | --- | --- | --- | --- |
| | PTBP | 3.40 | | | | |

*A: 2,6-Dimethyl-2,4,6-tri(4-hydroxyphenyl)heptene-3
B: α, α', α"-Tri(4-hydroxyphenyl)-1,3,5-triisopropylbenzene

TABLE 2

| Run No. | Double Refraction (n,m) R = 24 | R = 42 | R = 56 | Stringiness | State of Failure | Appearance |
| --- | --- | --- | --- | --- | --- | --- |
| Example 1 | 58 | 37 | 52 | No stringiness | Ductile | Good |
| Example 2 | 115 | 42 | 58 | " | " | Good |
| Example 3 | 42 | 35 | 36 | " | " | Good |
| Example 4 | 60 | 42 | 55 | " | " | Good |
| Example 5 | 120 | 47 | 61 | " | " | Good |
| Example 6 | 47 | 40 | 38 | " | " | Good |
| Example 7 | 36 | 20 | 16 | " | " | Good |
| Example 8 | 40 | 30 | 38 | " | " | Good |
| Example 9 | 35 | 25 | 25 | " | " | Good |
| Comparative Example 1 | 110 | 52 | 58 | Stringiness | Brittle | Good |
| Comparative Example 2 | 208 | 186 | 231 | " | " | Good |
| Comparative Example 3 | — | | | " | " | Poor |

Due to excellent fluidity of the branched polycarbonate resin, the optical article of the present invention exhibits decreased double fraction when the optical article is prepared under the same molding conditions as used in conventional molding conditions. The double refraction can be further reduced easily by suitably selecting molding conditions. In addition, the optical article of this invention shows only ductile failure upon bending, if such failure occurs. The branched polycarbonate resin of the present invention also has an advantage in that no stringiness occurs during the molding of the resin thereby making it possible to mold the optical article in a continuous molding process.

While the invention has been described in detail and with reference to specific embodiments thereof, it will be apparent to one skilled in the art that various changes and modifications can be made therein without departing from the spirit and scope thereof.

What is claimed is:

1. An optical article comprising a molding of a branched polycarbonate resin having a viscosity average molecular weight in the range of from 13,000 to 20,000 and having a Q value of at least $30 \times 10^{-2}$ cc/sec produced by injection molding at a resin temperature of from 280° to 360° C., said branched polycarbonate resin being produced from (1) at least one dihydric phenol compound, (2) a polyfunctional organic compound having at least two phenolic hydroxyl groups as a branching agent in an amount of from 0.1 to 1 mol% based on the amount of said dihydric phenol compound, and (3) a terminator in an amount of from 4.4 to 8.0 mol% based on the amount of said dihydric phenol compound.

2. The optical article as claimed in claim 1, wherein the branching agent is selected from a group consisting of 2,6-dimethyl-2,4,6-tri(4-hydroxyphenyl)heptene-3, 4,6-dimethyl-2,4,6-tri(4-hydroxyphenyl)heptene-2, 1,1,1-tri(4-hydroxyphenyl)ethane, α,α',α"-tri(4-hydroxyphenyl)-1,3,5-triisopropylbenzene, 3,3-bis(4-hydroxy-3-methylphenyl)oxyindole, 5-chloro-3,3-bis(4-hydroxy-3-methylphenyl)oxyindole, and 5,7-dichloro-3,3-bis(4-hydroxy-3-methylphenyl)oxyindole.

3. The optical article as claimed in claim 1, wherein a monofunctional organic compound represented by the formula (1):

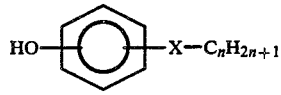

(1)

wherein X represents a chemical bond, —COO—, or —O—, and n is an integer of from 8 to 30 is used as the terminator in an amount of at least 10 mol% based on the total amount of terminators used.

4. The optical article as claimed in claim 3, wherein said terminator is represented by the formula (1) wherein X represents —COO— or —O— and n is an integer of from 10 to 20.

5. The optical article as claimed in claim 1, wherein said injection molding is carried out at a resin temperature of from 320° to 345° C.

6. The optical article as claimed in claim 1, wherein said branched polycarbonate has a viscosity average molecular weight of from 14,000 to 18,000.

* * * * *